US007986677B2

United States Patent
Park et al.

(10) Patent No.: US 7,986,677 B2
(45) Date of Patent: Jul. 26, 2011

(54) SYSTEM AND METHOD FOR FAST PAGING IN A WIRELESS MOBILE COMMUNICATION SYSTEM BASED ON INTERNET PROTOCOL

(75) Inventors: Chi-Hyun Park, Suwon-si (KR);
Sang-Boh Yun, Seongnam-si (KR);
Jung-Hoon Cheon, Suwon-si (KR);
Ok-Seon Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 676 days.

(21) Appl. No.: 11/510,086

(22) Filed: Aug. 25, 2006

(65) Prior Publication Data

US 2007/0055778 A1    Mar. 8, 2007

(30) Foreign Application Priority Data

Aug. 25, 2005  (KR) .................. 10-2005-0078352

(51) Int. Cl.
*H04Q 7/20*  (2006.01)
(52) U.S. Cl. .................. 370/338; 455/434; 455/435.1
(58) Field of Classification Search ............... 455/456.1
See application file for complete search history.

(56) References Cited

U.S. PATENT DOCUMENTS

| | | | | |
|---|---|---|---|---|
| 5,819,108 A * | 10/1998 | Hsu et al. | .................. | 710/10 |
| 6,308,267 B1 * | 10/2001 | Gremmelmaier | .................. | 713/168 |
| 6,473,411 B1 * | 10/2002 | Kumaki et al. | .................. | 370/331 |
| 6,487,406 B1 * | 11/2002 | Chang et al. | .................. | 455/422.1 |
| 6,591,306 B1 * | 7/2003 | Redlich | .................. | 709/245 |
| 6,594,253 B1 * | 7/2003 | Sallberg et al. | .................. | 370/349 |
| 6,735,202 B1 * | 5/2004 | Ahmed et al. | .................. | 370/392 |
| 7,142,520 B1 * | 11/2006 | Haverinen et al. | .................. | 370/311 |
| 7,328,281 B2 * | 2/2008 | Takeda et al. | .................. | 709/246 |
| 2001/0036834 A1 * | 11/2001 | Das et al. | .................. | 455/458 |
| 2002/0118656 A1 * | 8/2002 | Agrawal et al. | .................. | 370/329 |
| 2004/0157619 A1 * | 8/2004 | Corson et al. | .................. | 455/456.1 |
| 2005/0220061 A1 * | 10/2005 | Wawra et al. | .................. | 370/338 |
| 2005/0250474 A1 * | 11/2005 | Hong et al. | .................. | 455/411 |
| 2005/0272481 A1 * | 12/2005 | Kim | .................. | 455/574 |
| 2006/0099972 A1 * | 5/2006 | Nair et al. | .................. | 455/458 |
| 2006/0154663 A1 * | 7/2006 | Son et al. | .................. | 455/435.1 |
| 2007/0086395 A1 * | 4/2007 | Bakshi et al. | .................. | 370/338 |
| 2007/0087767 A1 * | 4/2007 | Pareek et al. | .................. | 455/502 |
| 2007/0105567 A1 * | 5/2007 | Mohanty et al. | .................. | 455/458 |
| 2007/0197219 A1 * | 8/2007 | Ryu et al. | .................. | 455/434 |
| 2007/0217381 A1 * | 9/2007 | Williams et al. | .................. | 370/338 |

FOREIGN PATENT DOCUMENTS

| EP | 1 534 031 | 5/2005 |
|---|---|---|
| KR | 1020010054331 | 7/2001 |

(Continued)

*Primary Examiner* — Dwayne D Bost
*Assistant Examiner* — Joseph Dean, Jr.
(74) *Attorney, Agent, or Firm* — The Farrell Law Firm, P.C.

(57) ABSTRACT

A system is provided for performing location update in a wireless mobile communication system that uses an Internet protocol (IP) address and is classified as at least one paging group. A serving base station (BS) sends a message including an identifier of a paging group where the serving BS is located, determines whether there is a change in IP subnet of a mobile station (MS) upon receipt of a location update request from the MS, and upon recognizing a change in IP subnet of the MS, stores information on a new IP subnet and notifies the change in the IP subnet to the MS. Upon detecting a need for location update, the MS sends a request for location update to a serving BS, and receives a location update success notification and an allocated temporary IP address from the serving BS.

17 Claims, 7 Drawing Sheets

FOREIGN PATENT DOCUMENTS

| | | |
|---|---|---|
| KR | 1020040001211 | 1/2004 |
| KR | 1020050045228 | 5/2005 |
| WO | WO 00/79814 | 12/2000 |
| WO | WO 2005/072495 | 8/2005 |

\* cited by examiner

SYSTEM AND METHOD FOR FAST PAGING IN A WIRELESS MOBILE COMMUNICATION SYSTEM BASED ON INTERNET PROTOCOL

PRIORITY

This application claims the benefit under 35 U.S.C. §119(a) of an application entitled "System and Method for Fast Paging in a Wireless Mobile Communication System Based on Internet Protocol" filed in the Korean Intellectual Property Office on Aug. 25, 2005 and assigned Serial No. 2005-78352, the contents of which are incorporated herein by reference.

BACKGROUND OF THE INVENTION

1. Field of the Invention

The present invention relates generally to a wireless mobile communication system based on an Internet Protocol (IP), and in particular, to a system and method for paging at high speed in an IP-based wireless mobile communication system.

2. Description of the Related Art

The wire and wireless communication systems are currently evolving into the next generation mobile communication system in which wire/wireless, voice, data and multimedia services are integrated over the Internet. The next generation mobile communication system aims at an ALL IP-based network configuration for combining computers and communication, with the rapid increase in Internet traffic and the development of communication technology.

If there is no data traffic to transmit/receive for a predetermined time, a mobile station (MS) of the next generation mobile communication system operates in an idle mode to minimize power consumption. The MS sends a message indicating start of the idle mode to a base station (BS), and the BS or a paging controller traces and registers a position of the MS operating in the idle mode. A description will now be made of an MS operating in the idle mode in, for example, an Institute of Electrical and Electronics Engineers (IEEE 802.16) communication system.

To operate in the idle mode, the MS sends a De-Registration Request (DREG-REQ) message to a serving BS with which it is currently communicating. Upon receipt of the DREG-REQ message, the serving BS sends a De-Registration Command (DREG-CMD) message to the MS to authorize operation in the idle mode. Tables 1 and 2 below show formats of the DREG-REQ and DREG-CMD messages, respectively.

TABLE 1

| Syntax | Size (bits) | Notes |
|---|---|---|
| DREG-REQ message format | — | — |
| Management message type = 49 | 8 | — |
| De-Registration_Request_Code | 8 | 0 x 00 = MSS De-Registration request from BS |
| | | 0 x 01 = request for MS De-Registration from serving BS and initiation of MS Idle Mode |
| | | 0 x 02 = Response for the Unsolicited MS De-Registration initiated by the BS. |
| | | 0 x 0 + 3 – 0 x FF = Reserved |
| TLV encoded parameters | variable | — |
| } | — | — |

TABLE 2

| Syntax | Size | Notes |
|---|---|---|
| DREG-CMD_Message_Format | | |
| Management Message Type = 29 | 8 bits | |
| Action Code | 8 bits | |
| TLV encoded parameters | variable | |
| } | | |

The MS requests an operation corresponding to a De-Registration_Request_Code value of the DREG-REQ message, and the serving BS requests or responds (authorizes) an operation corresponding to an Action Code value of the DREG-CMD message. The serving BS may use an unsolicited message as opposed to the DREG-CMD message, without having to receive the DREG-REQ message. For example, if the MS sets the De-Registration_Request_Code value of the DREG-REQ message to '01' before transmission, it indicates a transition request to the idle mode. If the serving BS sets the Action Code value of the DREG-CMD message to '05' before transmission, the MS transitions to the idle mode.

'Type/Length/Value (TLV) encoded parameters' fields of the DREG-REQ and DREG-CMD messages include a variety of parameter information, such as paging-related fields.

Figure 1:
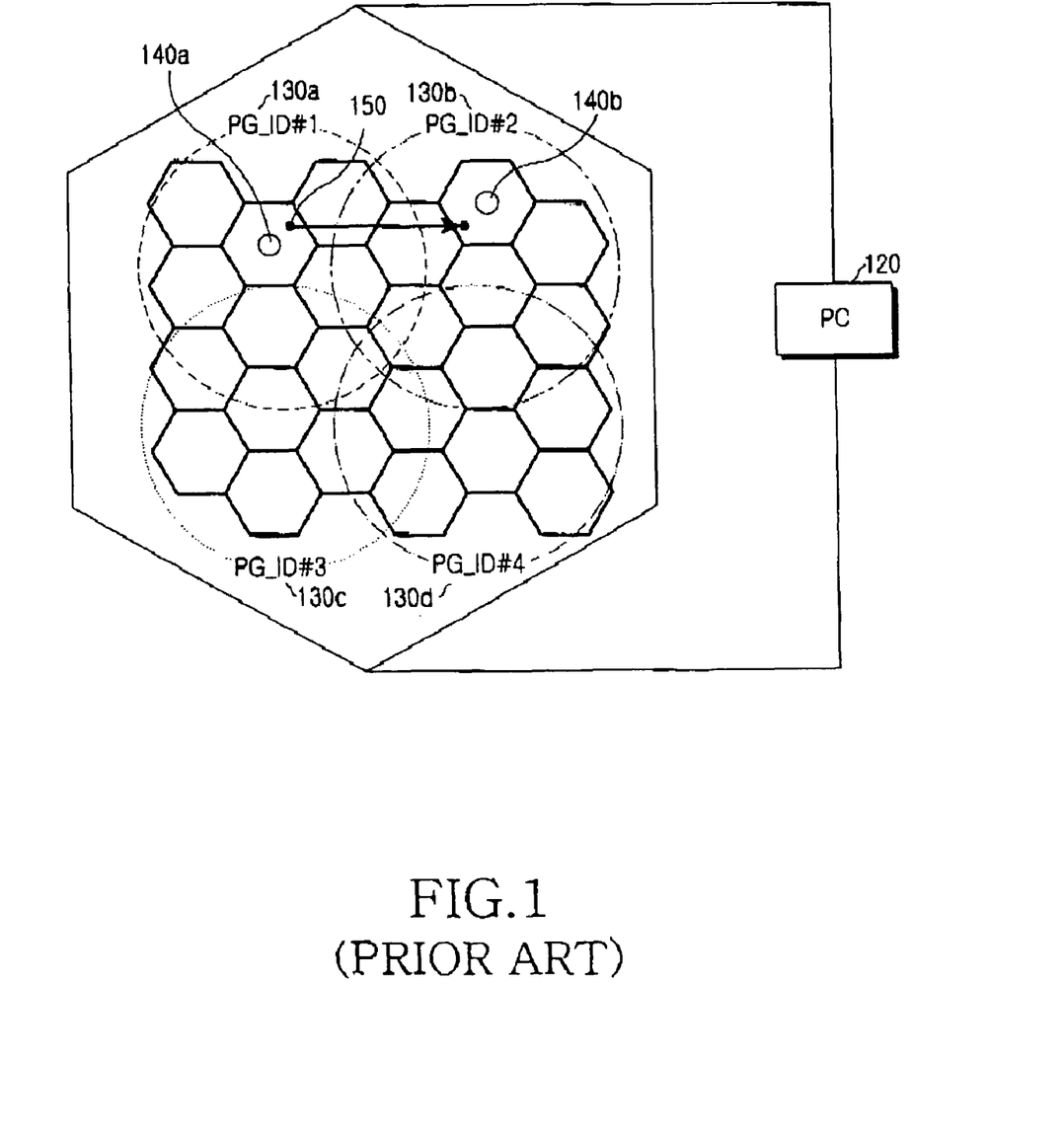
FIG. 1 is a diagram illustrating a paging service configuration in a conventional IEEE 802.16e communication system.

FIG. 1 is a diagram illustrating a paging service configuration in a conventional IEEE 802.16e communication system.

Referring to FIG. 1, neighbor cells can constitute one logical group according to their geographical location. A paging controller (PC) 120 assigns a Paging Identifier (PG_ID) to each logical paging group composed of a plurality of cells. The PC 120 may be included in a BS, or in another network entity. In FIG. 1, the cells are divided into four paging groups of PG_ID#1 130a, PG_ID#2 130b, PG_ID#3 130c and PG_ID#4 130d, and the paging groups are managed by the PC 120.

It is assumed that an MS 150 is now communicating with a serving BS 140a in the idle mode. In this case, all BSs belonging to the PG_ID#1 130a, or the PC 120 can page the MS 150. That is, if the MS 150 is located in coverage of the PG_ID#1 130a, it can receive a paging service from the PC 120 or the BSs belonging to the PG_ID#1 130a. When the MS 150 operating in the idle mode moves from an previous (old) paging group (i.e. PG_ID#1) to another (new) paging group (i.e. PG_ID#2), there are several schemes for recognizing the movement. One such scheme is receiving a Downlink Channel Descript (DCD) message, and another such scheme is receiving a Mobile Paging Advertisement (MOB_PAG-ADV) message. The following description will be made with reference to the MOB_PAG-ADV message.

Figure 2:
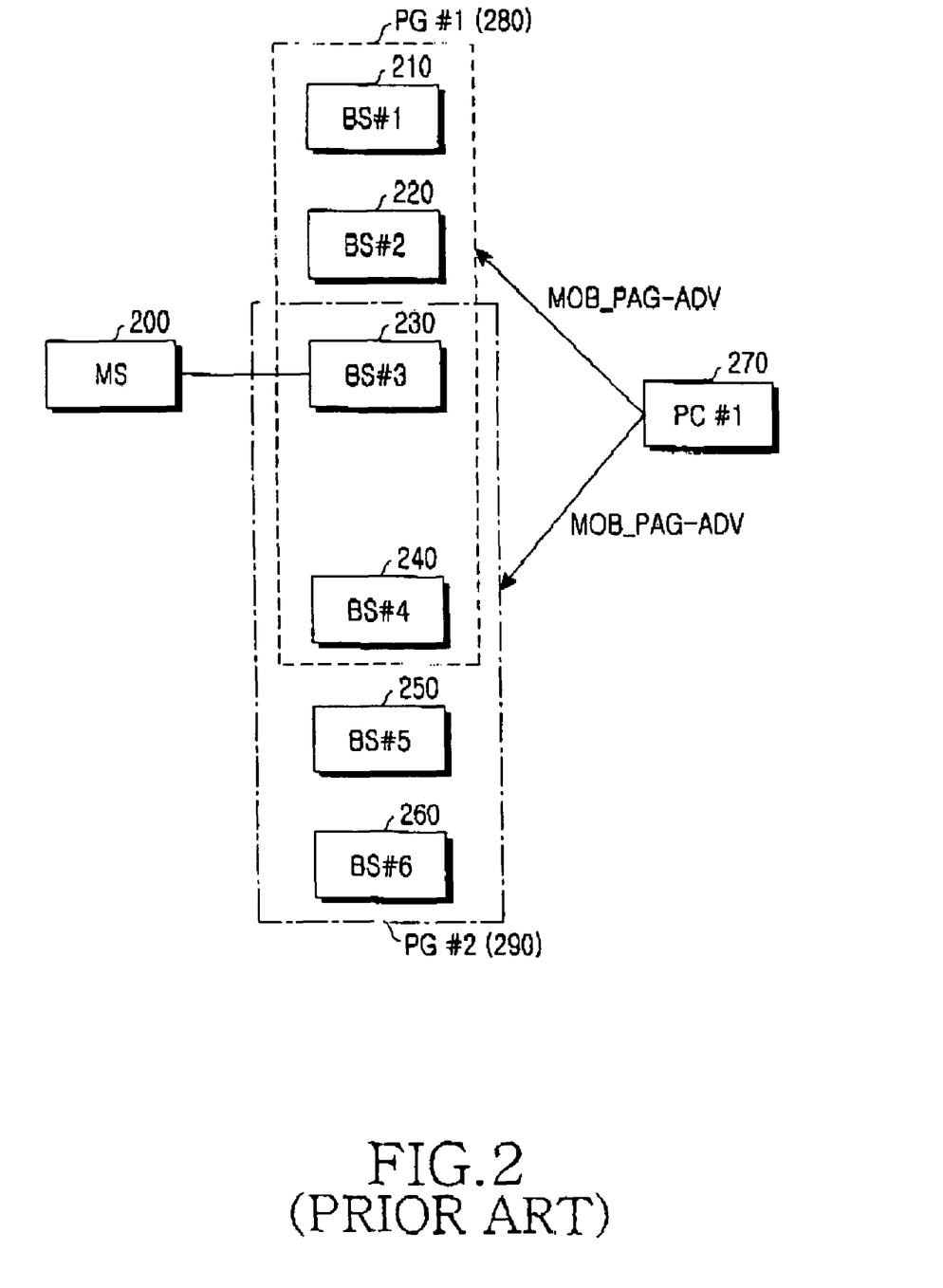
FIG. 2 is a diagram illustrating a paging operation in a conventional IEEE 802.16e communication system.

FIG. 2 is a diagram illustrating a paging operation in a conventional IEEE 802.16e communication system.

Referring to FIG. 2, BS#1 210, BS#2 220, BS#3 230 and BS#4 240 belong to PG#1 280, and BS#3 230, BS#4 240, BS#5 250 and BS#6 260 belong to PG#2 290. An MS 200 is located in a coverage area of the BS#3 230, and in the overlapping coverage area of the PG#1 280 and the PG#2 290.

If there is any packet data to transmit to the MS 200, PC#1 270 sends a MOB_PAG-ADV message to all MSs of PG#1 280 and PG#2 290. PC#1 270 pre-stores a Medium Access Control (MAC) address of the MS 200, a Home of Address (HoA), and information on the paging group to which the MS 200 belongs, and can communicate with the MS 200 using such information.

Figure 3:
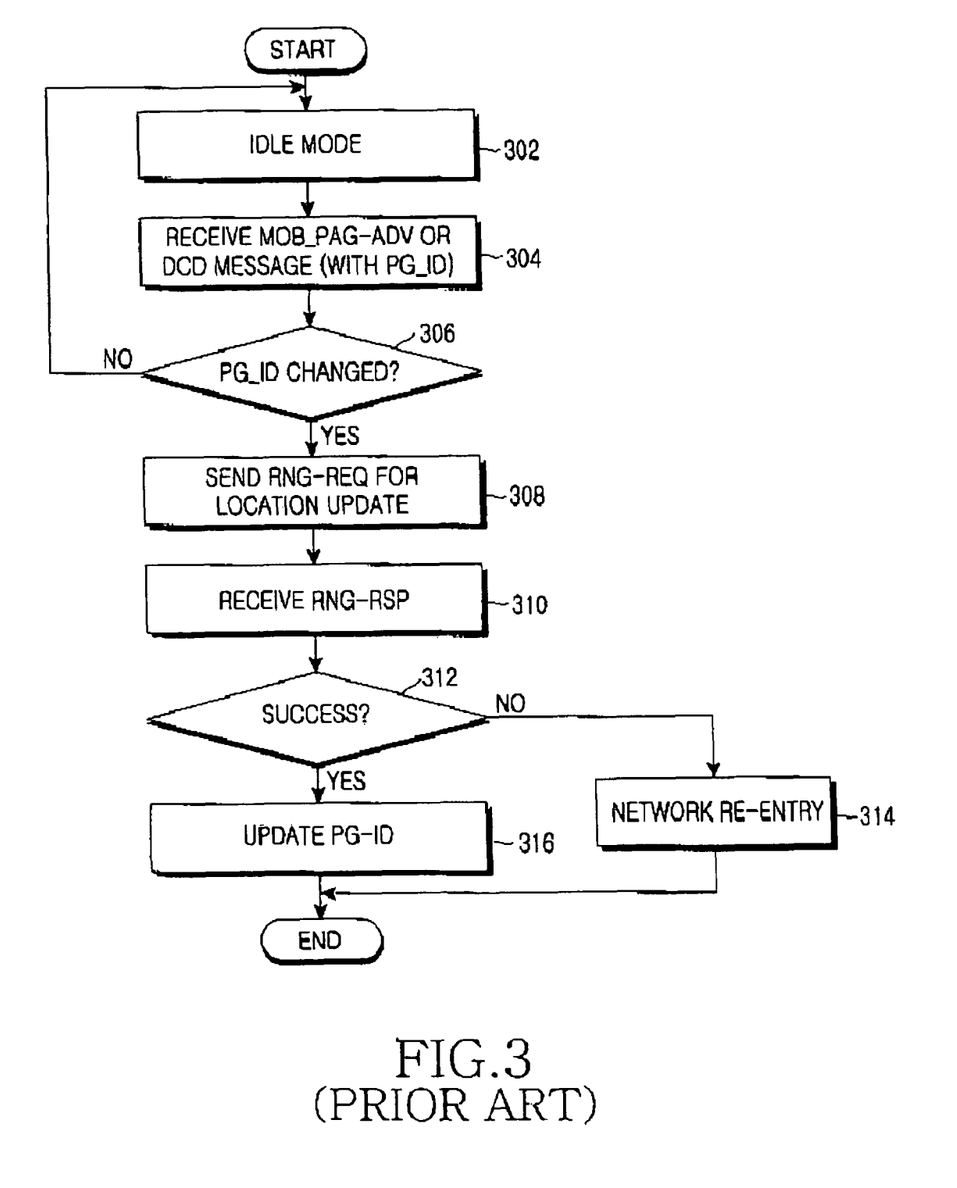
FIG. 3 is a flowchart illustrating a location update process performed by an MS in a conventional IEEE 802.16e communication system.

FIG. 3 is a flowchart illustrating a location update process performed by an MS in a conventional IEEE 802.16e communication system.

Referring to FIG. 3, in step 302, the MS operates in the idle mode through an exchange of a DREG-REQ message and a DREG-CMD message with a serving BS. In step 304, the MS receives a MOB_PAG-ADV message or a DCD message including PG_ID information. In step 306, the MS detects the PG_ID information included in the MOB_PAG-ADV message or the DCD message, and compares the detected new PG_ID information with its old PG_ID information. If the old PG_ID is different from the new PG_ID, the MS proceeds to step 308, recognizing a change in paging group. However, if there is no change in the paging group, the MS re-performs step 302 and its successive steps. Table 3 below shows a format of the MOB_PAG-ADV message.

indicates success in location update. If the Location Update Response field is set to '0x00' indicating failure in location update, the MS proceeds to step 314. However, if the Location Update Response field is set to '0x01' indicating success in location update, the MS proceeds to step 316. In step 314, the MS performs a network re-entry procedure. In step 316, the MS performs a PG_ID update procedure by storing the newly recognized PG_ID.

As described above, according to the conventional IEEE 802.16 standard, when an MS in the idle mode moves, changing its paging group, it updates a PG_ID through an exchange of RNG-REQ/RNG-RSP messages with the serving BS. However, as the communication system evolves based on ALL IP, there is currently no specific operation method capable of performing paging when an MS in the idle mode moves, changing its IP subnet. In the IP-based wireless mobile communication system, when an MS moves, thereby changing its IP subnet, it is expected that the MS will change, register and update an IP address in a call setup process during paging. This causes a time delay due to the call setup procedure.

Furthermore, the PC or PC-controlled BSs conventionally broadcast(s) a MOB_PAG-ADV message to all MSs belonging to at least one paging group. Therefore, system resource consumption and signaling load due to the transmission of the MOB_PAG-ADV message serve as overheads for the system.

SUMMARY OF THE INVENTION

It is, therefore, an object of the present invention to provide a system and method in which an MS can efficiently perform location update in an IP-based wireless mobile communication system.

TABLE 3

| Syntax | Size (bits) | Notes |
|---|---|---|
| MOB_PAG-ADV_Message_Format( ) { | — | — |
| Management Message Type = 62 | 8 | — |
| Num_Paging_Group_IDs | 8 | Number of Paging Group IDs in this message |
| For(i = 0;i < Num_Paging_Group_IDs;i ++){ | — | — |
| Paging Group ID | 8 | — |
| } | — | — |
| Num_MACs | 8 | Number of MS MAC addresses |
| For(j = 0;j < Num_MACs;j ++) { | — | — |
| MS MAC Address hash | 24 | The hash is obtained by computing CRC24 on the MS 48-bit MAC address. The polynomial for the calculation is 0 x 864CFB |
| Action Code | 2 bit | Paging action instruction to MS 0b00 = No Action Required 0b01 = Perform Ranging to establish location and acknowledge message 0b10 = Enter Network 0b11 = reserved |
| Reserved | 6 | — |
| } | — | — |
| padding | Variable | Padding bits to ensure octet aligned |
| TLV Encoded Information | Variable | TLV specific |
| } | — | — |

In step 308, the MS sends a Ranging Request (RNG-REQ) message for location update to the newly recognized serving BS. In step 310, the MS receives a Ranging Response (RNG-RSP) message from the serving BS. In step 312, the MS determines whether a Location Update Response field in a TLV encoded information field of the RNG-RSP message It is another object of the present invention to provide a paging system and method for minimizing a signaling load in an IP-based wireless mobile communication system.

According to the present invention, there is provided a method for performing location update by a mobile station (MS) in a wireless mobile communication system that uses an Internet protocol (IP) address and is classified as at least one paging group. The method includes sending, upon detecting a need for location update, a request for location update to a serving base station (BS); and receiving a location update success notification and an allocated temporary IP address from the serving BS.

According to the present invention, there is provided a method for performing location update by a serving base station (BS) including a paging controller in a wireless mobile communication system that uses an Internet protocol (IP) address and is classified as at least one paging group. The method includes sending a message including an identifier of a paging group where the serving BS is located, receiving a location update request from a mobile station (MS), determining whether there is a change in IP subnet of the MS, upon recognizing a change in IP subnet of the MS, storing information on a new IP subnet, and notifying the change in the IP subnet to the MS.

According to the present invention, there is provided a system for performing location update in a wireless mobile communication system that uses an Internet protocol (IP) address and is classified as at least one paging group. The system includes a mobile station (MS) and a serving base station (BS) including a paging controller. The serving BS sends a message including an identifier of a paging group where the serving BS is located, determines whether there is a change in IP subnet of the MS upon receipt of a location update request from the MS, and upon recognizing a change in IP subnet of the MS, stores information on a new IP subnet and notifies the change in the IP subnet to the MS. Upon detecting a need for location update, the MS sends a request for location update to a serving BS, and receives a location update success notification and an allocated temporary IP address from the serving BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for the sake of clarity and conciseness.

According to the present invention, in an Internet Protocol (IP)-based wireless mobile communication system, if a mobile station (MS) in an idle mode sends a request for location update, a paging controller (PC) receiving the location update request can send a notification indicating a change in routing area (RA) or a notification indicating allocation of a Care of Address (CoA), also known as a temporary IP address, in response to the location update request, recognizing that the MS has moved from a previous (old) IP subnet to another (new) IP subnet, i.e. recognizing the change in the routing area. In this manner, the PC can minimize a time delay due to the call setup process of the MS, and thus perform bidirectional communication using the CoA. In addition, the PC can minimize a signaling load, and thus send a Mobile Paging Advertisement (MOB_PAG-ADV) message. The PC may be included in a base station (BS), or in another network entity.

The present invention can be applied to all IP-based wireless mobile communication systems. Herein, for convenience, the present invention will be described with reference to an IEEE 802.16 communication system.

Figure 4:
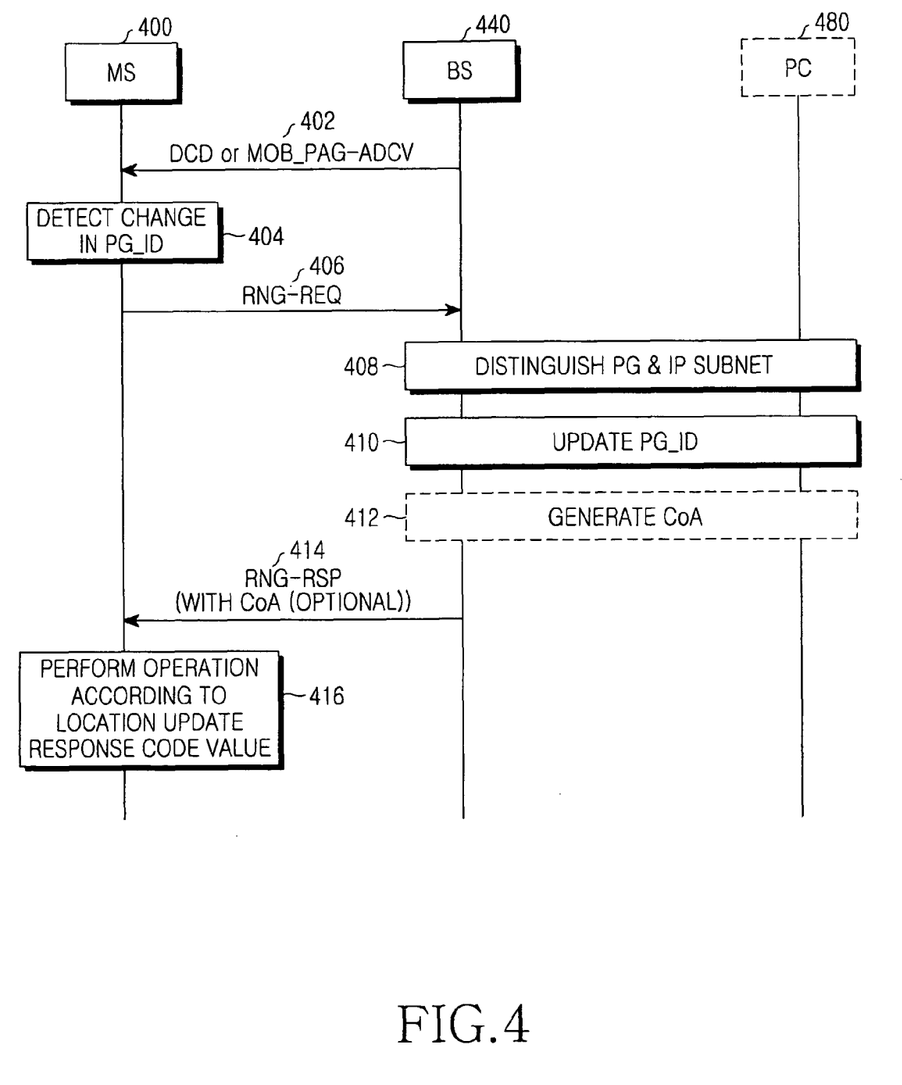
FIG. 4 is a signaling diagram illustrating a process of performing location update in response to a location update request of an MS in an IP-based wireless mobile communication system according to the present invention.

FIG. 4 is a signaling diagram illustrating a process of performing location update in response to a location update request of an MS in an IP-based wireless mobile communication system according to an embodiment of the present invention.

Referring to FIG. 4, a serving BS 440 sends a Downlink Channel Descript (DCD) message or a MOB_PAG-ADV message to an MS 400 in the idle mode in a frame interval in step 402. The MS 400 determines whether current Paging Group Identifier (PG_ID) information included in the DCD message or the MOB_PAG-ADV message is different from its previous PG_ID information in step 404. It is assumed herein that the current PG_ID is different from the previous PG_ID.

For location update, the MS 400 sends a Ranging Request (RNG-REQ) message with a second bit value of its Ranging Purpose Indication TLV encoded information field being set to '1' to the serving BS 440 in step 406.

A PC 480 managing paging groups and a paging operation, as described above, may be included in an arbitrary BS, or in another network entity. In FIG. 4, steps 408 to 412 are provided for a description of a paging-related operation regardless of the location of the PC 480.

The serving BS 440 receives the RNG-REQ message, and the PC 480 distinguishes a paging group (PG) and an IP subnet of the MS 400 in step 408. The PC 480 should pre-recognize to which IP subnet each of BSs belongs, and should also previously recognize coverage sizes of the IP subnet area (i.e. routing area) and the paging area (i.e. area defined as a paging group). As a result, the PC 480 can determine whether the MS 408 has moved, changing the IP subnet.

The serving BS 440 including the PC 480, or the PC 480 updates a PG_ID corresponding to the location of the MS 400 in step 410, recognizing the paging group where the MS 400 is located. The serving BS 440 or the PC 480 generates a Ranging Response (RNG-RSP) message newly proposed by the present invention. In the conventional RNG-RSP message, a bit value '0x00' and a bit value '0x01' are specified in a Location Update Response (LUR) field, as indicating idle mode location update failure and idle mode location update success, respectively, and a bit value '0x10' and a bit value '0x11' are reserved. However, in the RNG-RSP message according to the present invention, a bit value '0x10' and a bit value '0x10' are newly defined in a Location Update Response field. For example, when the MS 400 has moved, changing its IP subnet, the PC 480 can specify that the bit value '0x10' indicates 'success in location update and allocation of CoA', and the bit value '0x11' indicates 'success in location update and change in routing area'. Table 4 below shows a preferred format of a Location Update Response field in a TLV encoded information field of the RNG-RSP message according to the present invention.

TABLE 4

| Name | Type (1 byte) | Length | Value |
|---|---|---|---|
| Location Update Response | 23 | 1 | 0 x 00 = Failure of Location Update. The MS shall perform Network Re-entry from Idle Mode<br>0 x 01 = Success of Location Update<br>0 x 10 = Success of Location Update & Allocation of Care of Address<br>0 x 11 = Success of Location Update & Changing of Routing area |

If the serving BS 440 or the PC 480 needs to allocate a CoA for the MS 400, a process of generating the CoA is added in step 412. In this manner, the serving BS 440 or the PC 480 sends an RNG-RSP message to the MS 400 in step 414. The MS 400 performs an operation corresponding to a bit value of the Location Update Response field in the RNG-RSP message in step 416.

Figure 5:
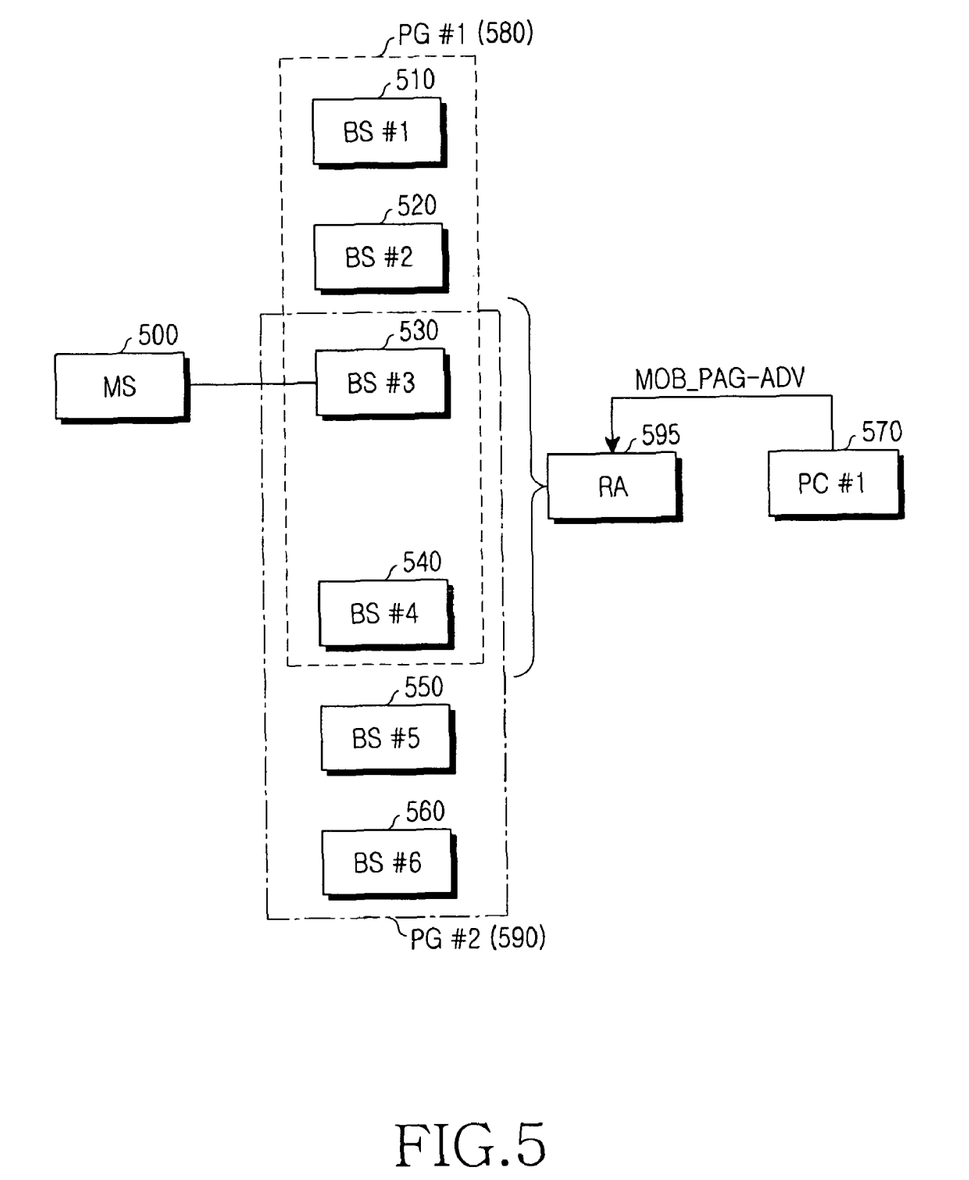
FIG. 5 is a diagram illustrating a paging operation in an IP-based wireless mobile communication system according to the present invention.

FIG. 5 is a diagram illustrating a paging operation in an IP-based wireless mobile communication system according to the present invention.

Referring to FIG. 5, BS#1 510, BS#2 520, BS#3 530 and BS#4 540 belong to PG#1 580, and BS#3 530, BS#4 540, BS#5 550 and BS#6 560 belong to PG#2 590. An MS 500 is located in the coverage area of the BS#3 530, and in the overlapping coverage area of the PG#1 580 and the PG#2 590. The BS#3 530 and the BS#4 540 are located in a routing area (RA) 595 where they use the same IP subnet. Therefore, PC#1 570 sends a MOB_PAG-ADV message for each individual routing area, compared with the conventional PC that sends the MOB_PAG-ADV message for each individual paging group.

For example, if there is any data packet to transmit to the MS 500, the PC#1 570 recognizes the routing area to which the MS 500 belongs, and sends a MOB_PAG-ADV message only to the MS 500 belonging to the corresponding routing area. As a result, the newly proposed scheme of sending the MOB_PAG-ADV message for each individual routing area is less in signaling overhead than the conventional scheme of sending the MOB_PAG-ADV message for each individual paging group.

Figure 6:
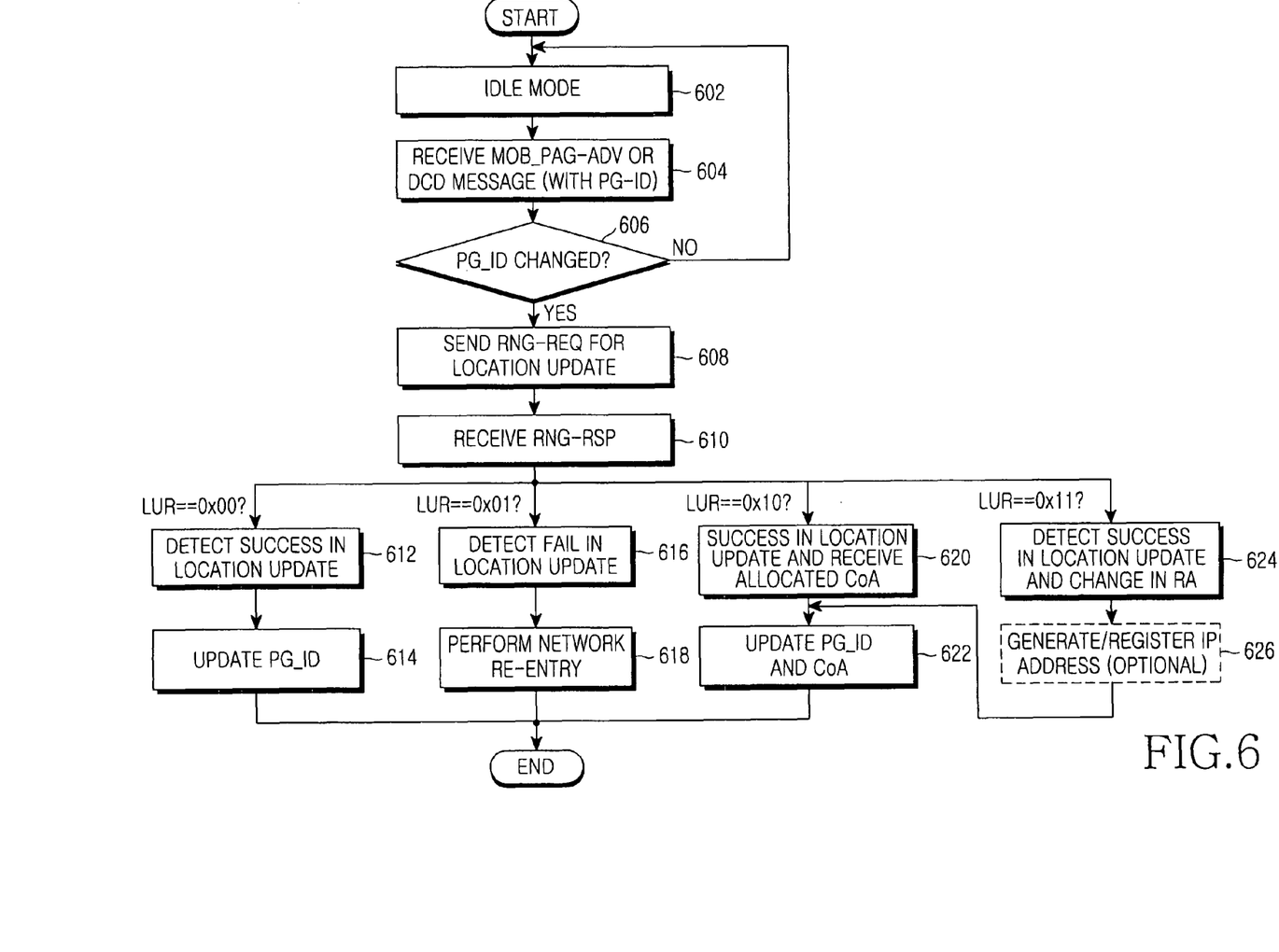
FIG. 6 is a flowchart illustrating a process of performing location update by an MS in an IP-based wireless mobile communication system according to the present invention.

FIG. 6 is a flowchart illustrating a process of performing location update by an MS in an IP-based wireless mobile communication system according to the present invention.

Referring to FIG. 6, the MS operates in the idle mode in step 602. The MS receives a MOB_PAG-ADV message or a DCD message from a serving BS in step 604. The MS compares the current PG_ID information included in the received message with its previous PG_ID information in step 606. If the previous PG_ID is different from the current PG_ID, the MS proceeds to step 608. However, if the previous PG_ID is identical to the current PG_ID, the MS re-performs step 602 and its successive steps.

In step 608, for location update, the MS sends an RNG-REQ message with a second bit value of its Ranging Purpose Indication field being set to '1' to the serving BS. In step 610, the MS receives an RNG-RSP message from the serving BS, and then proceeds to any one of steps 612, 616, 620 and 624.

If a Location Update Response (LUR) bit value of the RNG-RSP message is set to '0x00', the MS recognizes in step 612 that it has succeeded in location update. In step 614, the MS updates the previous PG_ID with the newly recognized PG_ID.

If the LUR bit value of the RNG-RSP message is set to '0x01', the MS recognizes in step 616 that it has failed in location update. In step 618, the MS performs a network re-entry procedure.

If the LUR bit value of the RNG-RSP message is set to '0x10', the MS recognizes in step 620 that it has succeeded in location update and is allocated a CoA for bidirectional communication. In step 622, the MS updates the newly recognized PG_ID and CoA. In the IP-based bidirectional wireless mobile communication system, when the MS changes its IP subnet, it needs a procedure for acquiring and registering a new IP address for data transmission/reception. However, in unidirectional communication, because an MS only needs to receive data, it is possible to deliver data to the corresponding MS only with the PG_ID and MAC address even though an IP subnet of the MS changes. Therefore, while the process of acquiring and registering the IP address is not necessary in the unidirectional wireless mobile communication system, the process of acquiring and registering the IP address is necessary in the bidirectional wireless mobile communication system.

If the LUR bit value of the RNG-RSP message is set to '0x11', the MS recognizes in step 624 that it has succeeded in location update and its routing area has changed, and then proceeds to step 626 or 622. Step 626 is performed only when the MS recognizes the need for newly generating and registering the IP address. For example, when the system uses Mobile IPv6 (MIPv6) or there is a need for an authentication procedure during CoA allocation for the MS, the PC sends an RNG-RSP message with the bit value '0x11' specified therein to the MS. In addition, in order to reduce a time delay due to the generation and registration of the IP address, the system is designed such that the PC generates a CoA and sends an RNG-RSP message with the bit value '0x10' specified therein to the MS along with the generated CoA.

Figure 7:
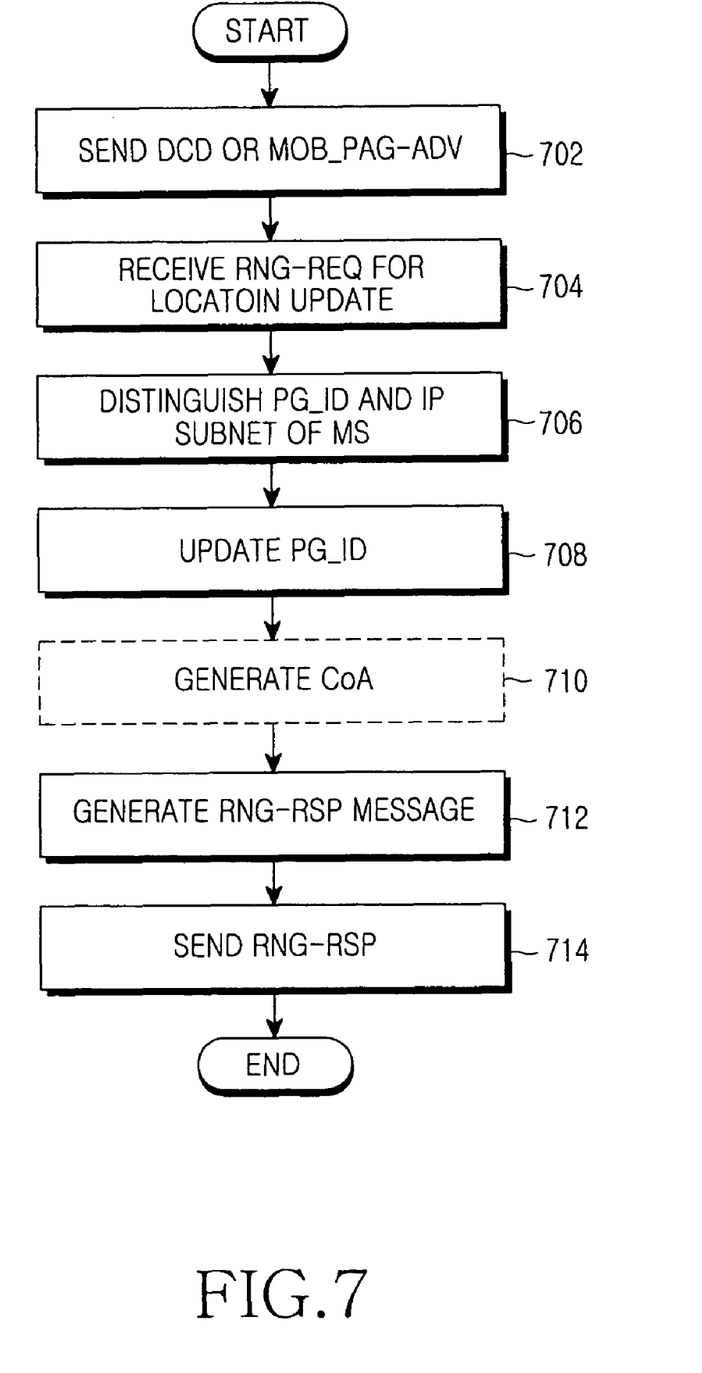
FIG. 7 is a flowchart illustrating a process of performing location update by a serving BS including a PC in an IP-based wireless mobile communication system according to the present invention.

FIG. 7 is a flowchart illustrating a process of performing location update by a serving BS including a PC in an IP-based wireless mobile communication system according to the present invention.

Referring to FIG. 7, the serving BS sends a DCD or MOB_PAG-ADV message to an MS in step 702. The serving BS receives an RNG-REQ message for location update from the MS in step 704. The serving BS distinguishes a paging group and an IP subnet, in which the MS is currently located, in step 706. The serving BS maintains the PG_ID of the MS and the previous IP subnet information, or updates new IP subnet information in step 708. In step 710, the serving BS generates a CoA to be allocated to the MS, if an LUR bit value of the RNG-RSP message is set to '0x10'. The serving BS generates an RNG-RSP message in step 712, and sends the generated RNG-RSP message to the MS in step 714.

As can be understood from the foregoing description, the IP-based wireless mobile communication system according to the present invention broadcasts a MOB_PAG-ADV message for each individual IP subnet, thereby minimizing its signaling load. In addition, during location update, an MS is allocated an IP address from a PC, thereby minimizing a time delay due to the call setup procedure.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing location update by a mobile station (MS) in a wireless mobile communication system that uses an Internet protocol (IP) address and is classified as at least one paging group, the method comprising the steps of:
    sending a request for a location update to a serving base station (BS) upon detecting a change in a paging group identifier (PG ID); and
    receiving a location update success notification and an allocated temporary IP address from the serving BS in response to the request for the location update;
    wherein the location update success notification indicates that the MS has succeeded in the location update and an IP subnet area of the MS has changed, and comprises a first bit value in a location update response field that indicates allocation of the temporary IP address and a second bit value in the location update response field that indicates a change in the IP subnet area;
    wherein the MS is in an idle mode.

2. The method of claim 1, further comprising, upon detecting a need for generating an IP address, performing an IP address generation and registration procedure with an upper network entity.

3. The method of claim 1, wherein the step of detecting a change in the PG ID comprises:
    receiving, from the serving BS, a current paging group identifier (PG_ID) included in a paging advertisement (MOB_PAG-ADV) message or a downlink channel descript (DCD) message transmitted in a current frame interval;
    comparing the current PG_ID with a previous PG_ID received in a previous frame interval; and
    detecting a need for the location update, if the current PG_ID is different from the previous PG_ID.

4. The method of claim 1, wherein the location update request is sent using a ranging request (RNG-REQ) message.

5. The method of claim 1, wherein the step of receiving a location update success notification and an allocated temporary IP address from the serving BS is performed using a location update response field in a Type/Length/Value (TLV) field included in a ranging response (RNG-RSP) message.

6. The method of claim 1, wherein the MS is notified from the serving BS that the MS has succeeded in location update and has moved, changing an IP subnet area, using a location update response field in a TLV field included in an RNG-RSP message.

7. A method for performing location update by a serving base station (BS) including a paging controller in a wireless mobile communication system that uses an Internet protocol (IP) address and is classified as at least one paging group, the method comprising the steps of:
    sending a message including an identifier of a paging group where the serving BS is located;
    receiving a location update request from a mobile station (MS);
    determining whether there is a change in IP subnet of the MS;
    upon recognizing the change in the IP subnet of the MS, storing information on a new IP subnet and generating a temporary IP address; and
    notifying the change in the IP subnet to the MS and sending the temporary IP address to the MS, in response to the location update request, wherein a notification of the change in the IP subnet comprises a first bit value in a location update response field that indicates allocation of the temporary IP address and a second bit value in the location update response field that indicates the change in the IP subnet;
    wherein the MS is in an idle mode.

8. The method of claim 7, wherein the temporary IP address is sent along with a ranging response (RNG-RSP) message.

9. The method of claim 7, wherein the identifier of the paging group is included in a paging advertisement (MOB_PAG-ADV) message, and the MOB_PAG-ADV message is sent to an MS distinguished by an IP subnet area.

10. A system for performing location update in a wireless mobile communication system that uses an Internet protocol (IP) address and is classified as at least one paging group, the system comprising:
    a mobile station (MS) in an idle mode; and
    a serving base station (BS) including a paging controller;
    wherein the serving BS sends a message including an identifier of a paging group where the serving BS is located, determines whether there is a change in an IP subnet of the MS upon receipt of a location update request from the MS, and upon recognizing the change in the IP subnet of the MS, stores information on a new IP subnet;
    wherein upon detecting a changing in a paging group identifier (PG ID), the MS sends a request for the location update to a serving BS, and receives a location update success notification and an allocated temporary IP address from the serving BS in response to the request for the location update;
    wherein upon receipt of the request for the location update from the MS, the serving BS sends the allocated temporary IP address and the location update success notification indicating that the MS has succeeded in the locate update and the IP subnet has changed; and
    wherein the location update success notification comprises a first bit value in a location update response field that indicates allocation of the temporary IP address and a second bit value in the location update response field that indicates change in the IP subnet.

11. The system of claim 10, wherein the MS receives from the serving BS a current paging group identifier (PG_ID) included in a paging advertisement (MOB_PAG-ADV) message or a downlink channel descript (DCD) message transmitted in a current frame interval, compares the current PG_ID with a previous PG_ID received in a previous frame interval, and detects a need for location update, if the current PG_ID is different from the previous PG_ID.

12. The system of claim 10, wherein the MS sends the location update request using a ranging request (RNG-REQ) message.

13. The system of claim 10, wherein the MS receives the location update success notification and the allocated temporary IP address from the serving BS, using a location update response field in a Type/Length/Value (TLV) field included in a ranging response (RNG-RSP) message received from the serving BS.

14. The system of claim 10, wherein the MS is notified from the serving BS that the MS has succeeded in the location update and has moved, changing an IP subnet area, using a location update response field in a Type/Length/Value (TLV) field included in a ranging response (RNG-RSP) message.

15. The system of claim 10, wherein upon recognizing the change in the IP subnet of the MS, the serving BS generates a temporary IP address, and sends the generated temporary IP address to the MS.

16. The system of claim 15, wherein the serving BS sends the temporary IP address along with a ranging response (RNG-RSP) message.

17. The system of claim 10, wherein the serving BS includes the identifier of the paging group in a paging advertisement (MOB_PAG-ADV) message, and sends the MOB_PAG-ADV message to an MS distinguished by an IP subnet area.

* * * * *